United States Patent [19]
Rohrer

[11] Patent Number: 5,771,677
[45] Date of Patent: *Jun. 30, 1998

[54] COMBINED CYCLE POWER PLANT WITH INTEGRATED CFB DEVOLATILIZER AND CFB BOILER

[75] Inventor: John W. Rohrer, 133 Pope Ave., South Portland, Me. 04106

[73] Assignee: John W. Rohrer, York, Me.

[*] Notice: The term of this patent shall not extend beyond the expiration date of Pat. No. 5,666,801.

[21] Appl. No.: 704,973

[22] Filed: Aug. 29, 1996

Related U.S. Application Data

[63] Continuation-in-part of Ser. No. 522,763, Sep. 1, 1995, Pat. No. 5,666,801.
[51] Int. Cl.$^6$ .............................. F02C 3/26; F02C 3/28; F02C 3/30; F02C 3/34
[52] U.S. Cl. .................. 60/39.02; 60/39.12; 60/39.464; 110/204
[58] Field of Search .............................. 60/39.52, 39.02, 60/39.464, 39.463, 39.12, 39.182, 39.55; 110/204, 205

[56] References Cited

U.S. PATENT DOCUMENTS

| | | | |
|---|---|---|---|
| 3,804,606 | 4/1974 | Archer et al. ........................ | 60/39.182 |
| 4,355,601 | 10/1982 | Hattiangadi . | |
| 4,391,586 | 7/1983 | Brown .................................... | 110/204 |
| 5,218,815 | 6/1993 | Korenberg ............................. | 60/39.55 |
| 5,255,504 | 10/1993 | Hodrien et al. ....................... | 60/39.12 |
| 5,335,609 | 8/1994 | Nelson et al. ......................... | 110/204 |
| 5,400,723 | 3/1995 | Okuno et al. ......................... | 110/204 |
| 5,403,809 | 4/1995 | Miller et al. .......................... | 502/413 |
| 5,599,508 | 2/1997 | Martinelli et al. .................... | 422/169 |

FOREIGN PATENT DOCUMENTS

| | | |
|---|---|---|
| 3642619 | 6/1988 | European Pat. Off. . |
| 0 602 795 | 6/1994 | European Pat. Off. . |
| 2 274 883 | 8/1994 | European Pat. Off. . |

OTHER PUBLICATIONS

G. Lozza, et al., "Combined–Cycle Power Stations using Clean–Coal technologies": Thermodynamic Analysis of Full Gasification Versus Fluidized Bed Combustion With Partial Gasification, *Journal of Engineering For Gas Turbines and Power*, vol. 118, Oct. 1996.

J. McClung, "The Advanced PFBC Process From Pilot Plan to Demonstration", Foster Wheeler Development Corporation, Livingston, New Jersey, Undated pp. 193–200.

Cate Jones, "New Coal Based Power Cycles Aim to Compete With Gas", *New Technology*, Mar. 1995, pp. 52–59.

Robert Swanekamp, "Ridge Station Eases Florida's Waste–Disposal Problems" *Power*, Oct. 1994 pp. 84–85.

John C. Haas, Ph.D, "The Hot Air Brayton Cycke Indirect Air Heating And Partial Natural Gas Firing" *Combustion Power Company*, Undated, pp. 361–371.

Jason Makansi, "Developments To Watch The Next Generation of Powerplants" *Power*, May 1993, pp. 79–82.

*Primary Examiner*—Timothy Thorpe
*Assistant Examiner*—Ted Kim
*Attorney, Agent, or Firm*—Morgan & Finnegan, L.L.P.

[57] ABSTRACT

A high efficiency economical coal fired combined cycle power generation system and process is described. The system utilizes a circulating fluid bed ("CFB") coal devolatilizer which is fluidized with recycled coal volatiles. The devolatilizer is heated indirectly with hot bed material from a conventional CFB boiler burning the devolatilized coal (char). The CFB boiler is fluidized by gas turbine exhaust gas. The ratio of high efficiency/low capital cost Brayton cycle (gas turbine) power output to lower efficiency, higher capital cost Rankine cycle (steam turbine) power output is maximized by concurrently and/or successively preheating the gas turbine compressor discharge with; (1) gas turbine exhaust (recuperator), (2) hot coal volatiles exiting the devolatilizer, (3) coal char CFB boiler hot bed material (with either an external or internal heat exchanger), and (4) CFB boiler flue gas. The process and method described produces a thermally cracked, clean product gas with a high Btu content (~500 BTU/SCF) and is, therefore, readily usable in gas turbines which are designed for natural gas without design modification. This high Btu product gas also reduces fuel gas cleaning volume and fuel gas sensible heat loss.

8 Claims, 4 Drawing Sheets

COMBINED CYCLE POWER PLANT WITH INTEGRATED CFB DEVOLATILIZER AND CFB BOILER

RELATED APPLICATIONS

This is a continuation-in-part of application Ser. No. 08/522,763, filed on Sep. 1, 1995, now U.S. Pat. No. 5,666,801, the entire contents of which are incorporated herein by reference.

FIELD OF THE INVENTION

The present invention relates to a high efficiency coal based power generating system using circulating fluidized bed ("CFB") technology and processes for generating power from volatile containing carbonaceous feed using such system. More specifically, the present invention relates to a combined steam and gas turbine power plant that increases the generating efficiency of the plant's power by using an indirectly heated, fully entrained flow circulating fluid bed devolatilizer/thermal cracker. The power plant maximizes the ratio of gas turbine output (Brayton Cycle) to steam turbine output (Rankine Cycle). The present invention also relates to processes for generating power from volatile containing carbonaceous feeds using such power plant.

BACKGROUND OF INVENTION

Advances in combustion turbines over the past several years have made natural gas fired, gas turbine, combined cycle plants efficient, clean and reliable. Because of this, they have become the preferred new power generating alternative for locations where natural gas is readily available, e.g., via a pipeline. The cost of power from the new natural gas combined cycle plants is currently approximately 60% of that obtained from pulverized coal-based plants of equal or larger scale even where coal is delivered at 60% of the price of natural gas.

Bailie, U.S. Pat. No. 3,853,498, describes an indirectly heated biomass gasifier which uses hot bed material from a stationary (bubbling fluid bed) exothermic char combustor to indirectly dry and devolatilize biomass fed to an endothermic stationary (bubbling bed) devolatilizer (also known as gasifier or pyrolizer). Because of the high volatile content of biomass used in the Bailie process (above 80% by weight), most or all of the char combustion exothermic heat is required to supply the endothermic requirements of the devolatilizer. For this reason Bailie's biomass gasifier is not suitable for coal. It is not integrated into a combined cycle power plant.

Feldmann et al., U.S. Pat. No. 4,828,581, describe an improvement over the Bailie patent for a specific indirectly heated biomass gasifier/devolatilizer vessel design. The '581 patent describes a two zone indirectly heated biomass devolatilizer. The initial fluidization velocity, like that of Bailie, is in the stationary or bubbling region (below 7 feet per second (FPS)) using steam or recycled product gas for initial fluidization. Once high volatile biomass feed is introduced, however, to the top of this first zone, the rapid release of the large quantities of volatiles and moisture intrinsic to biomass produces velocities (above 15 FPS) sufficient to fully entrain the flow of bed material with residual char. The vessel used in the '581 patent has a higher length to diameter ratio than Bailie's devolatilizer (above 6:1). It also has a throughput per unit of vessel section area about 10 times that noted for stationary (bubbling) bed biomass gasifiers. Use of the '581 patent devolatilizer with coal or integration into a combined cycle power plant is not described. The two zone devolatilizer vessel design of Feldmann will not work with most coals. This is because coal provides insufficient moisture and volatile release to raise stationary bed (bubbling) fluidization velocities from below the 7 FPS claimed to above 15 FPS necessary for stable entrained flow. Even for those low rank, high moisture content coals where marginally sufficient volatiles may be released for entrained flow, a two zone gasifier vessel with "first space" velocities below the 7 FPS claimed adds complexity without compensatory advantages. Like Bailie, the vessel is not integrated into a combined cycle power plant.

Schemenau, U.S. Pat. No. 4,901,521, describes a coal fired combined gas turbine and steam turbine power plant utilizing either a circulating fluidized bed (CFB) boiler or a bubbling fluid bed boiler. In one embodiment, hot CFB boiler bed material is directly contacted with only a portion of the raw coal feed in the CFB bed return conduit. This technique does not create a fluidizing zone. As a result, only a portion of the coal volatiles available for use as gas turbine fuel are recovered. In another embodiment, a stationary (bubbling bed) coal combustor (not a CFB) is utilized together with a stationary (bubbling) fluid bed devolatilizer (which they call a degasifier/gasifier) in a manner similar to Bailie, but for coal, not biomass. This devolatilizer is fluidized with boiler exhaust gas containing $CO_2$ and $N_2$, thus substantially diluting the product gas Btu content.

Furthermore, use of a stationary fluid bed devolatilizer in Schemenau results in an order of magnitude lower throughput. Also, a product gas with higher tar and condensible liquids content due to less thermal cracking than is possible with CFB devolatilizer results. Schemenau does not teach or suggest maximizing the ratio of higher efficiency gas turbine output to lower efficiency steam output because, (1) only a portion, not all of the raw coal is fed directly into the devolatilizer; (2) a portion of turbine exhaust gas sensible heat is not used to preheat turbine air compressor discharge prior to the turbine combustor (recuperator); (3) a portion of product gas sensible heat is not used to preheat gas turbine compressor discharge; (4) a portion of the fluid bed boiler bed material or exhaust gas sensible heat is not used to preheat gas compressor air discharge; (5) the devolatilizer lacks positive gas sealing means to prevent a portion of the volatile produced from escaping to the combustor or its exhaust; and (6) combustible gas production is not increased when necessary via the addition of steam and air or oxygen to the devolatilizer.

Gounder, U.S. Pat. No. 5,255,507, describes integrating a coal CFB boiler with a gas turbine cycle and using a recuperator in combination with an external fluid bed gas turbine air heater. The '507 patent does not, however, describe integrating a coal CFB boiler with a devolatilizer heated indirectly with the CFB boiler's hot bed material. The '507 patent does not teach or suggest maximizing the ratio of gas turbine cycle output to steam turbine cycle output because, (1) a portion of the raw coal is fed directly to the CFB boiler; (2) sensible heat from the gasifier is not used to preheat gas turbine compressor air; and (3) sensible heat from the CFB boiler exhaust gas is not used to preheat gas turbine compressor air. In the '507 patent, a portion of the gas turbine fuel input is supplied by "a first fuel source" of natural gas, not coal gas. When natural gas is available via pipeline, the use of any coal based power technology today is seldom economic (due to 2 to 3 fold higher capital costs, 20% to 35% lower fuel efficiency and 2 fold higher operating and maintenance costs, all per Kwh of electrical output).

European Patent 607,795 to Dietz describes a CFB unit incorporated into a combined cycle system in a manner similar to Grounder.

SUMMARY OF THE INVENTION

The present invention relates to a power generating system and process. Volatile containing carbonaceous feed, e.g., coal, fired combined gas turbine cycle (Brayton cycle) and a steam turbine cycle (Rankine cycle) power plant are provided where the gas turbine is fully integrated with both a conventional coal fully entrained bed ("CFB") boiler and a fully entrained bed ("CFB") devolatilizer/thermal cracker. Alternatively, the volatile feed can be pitch, orimulsion, residual or heavy oils, shales, tar sands or biomass. The CFB devolatilizer/thermal cracker of the present invention uses the CFB boiler's hot bed material to indirectly supply the necessary endothermic heat for devolatilizing and cracking carbonaceous feed, e.g. coal.

The CFB boiler uses gas turbine exhaust gas for all or part of the CFB boiler's fluidizing gas and combustion air supply. Part of the gas turbine's thermal input is provided by the CFB boiler's hot bed material and hot flue gas, and fuel gas cooling, thus reducing the gas turbine combustor's fuel requirement and maximizing the ratio of higher efficiency, lower capital cost Brayton cycle power output to less efficient, higher capital cost Rankine cycle power output.

Alternatively, the ratio of Brayton cycle to Rankine cycle output can be maximized by using steam and air or oxygen to replace some or all of the recycled product gas as a fluidizing gas in the devolatilizer/thermal cracker. Thus, the product gas yield is increased and the char yield from lower volatile containing feeds reduced. In this embodiment, part of the gas turbine's thermal input is provided via heat exchangers.

The indirectly heated fully entrained flow CFB devolatilizer/thermal cracker is fluidized to entrainment velocities with recirculated cracked coal volatiles (product gas) thus produced. When lower volatile feeds are used or higher gas yields are desired, steam and air or oxygen are added to or replace the product gas. The CFB boiler receives the devolatilized coal or other devolatilized feed (char) and somewhat cooled bed material and combusts the char to reheat the bed material and provide part of the thermal energy for the Rankine power cycle, and optionally the Brayton cycle.

Accordingly, an object of the present invention is to overcome the drawbacks of the prior art by maximizing gas turbine power output to steam turbine power output for coal of any given volatile content.

A further object of the present invention is to maximize the ratio of Brayton cycle to Rankine cycle power output by using all available high grade (high temperature) heat for preheating gas turbine compressor air prior to fuel gas combustion.

A still further object includes recovering heat from the gas turbine exhaust (via a recuperator), hot product gas (thermally cracked coal volatiles), CFB boiler bed material, and hot CFB boiler flue gas for preheating gas turbine compressor air.

Another object of the present invention is to fully devolatilize and thermally crack all the carbonaceous feed to generate a product gas for the power generating system.

Another object of the present invention is to increase more efficient Brayton cycle output, even on lower volatile feeds, by introducing steam and air or oxygen to the devolatilizer. This increases gas production and reduces char production and is more cost effective than using heat exchangers to transfer heat to the gas turbine (Brayton cycle).

A further object of the present invention is to use the volatile content of all grades of coals to increase the efficiency of a coal-based power system.

A still further object of the present invention is that steam (including super heated and reheated steam) is only generated (with the highest practical steam cycle efficiency) with excess heat which cannot be effectively used to preheat gas turbine compressor air prior to being introduced into the gas turbine combustor. Another object of the present invention is to use all available oxygen in the turbine exhaust in an exothermic reaction with substantially devolatilized carbonaceous feed in the CFB boiler.

Another object of the present invention is to upgrade existing coal based power systems by using an atmospherically-operated CFB devolatilizer/thermal cracker with an exothermic boiler combustor and a gas turbine fueled by the product gas from the CFB devolatilizer/thermal cracker.

Another object of the present invention is to produce an excess of product gas for export use in chemical plants or general supply (Town gas).

An advantage of using a CFB (entrained flow) devolatilizer/thermal cracker in the present invention is that it has higher throughput and fewer tars and condensible oils than alternative reactors.

A further advantage of using a portion of the char to drive the devolatilization process is that it preserves all of the cracked coal volatiles for use as gas turbine topping fuel.

An advantage of the coal devolatilization and thermal cracking process of the present invention, compared to traditional full coal gasification via partial oxidation with air or expensive oxygen at atmospheric or gas turbine pressure, is that it has a lower gasification endothermic requirement while producing gas above 450 Btu/SCF vs. less than 300 Btu/SCF for oxygen blown and less than 150 Btu/SCF for air blown gasifiers.

Another advantage according to the present invention is that the resulting product gas is directly substituted for natural gas in most commercial gas turbines and the lower gas volume reduces gas compression energy loss, sensible heat losses and gas cleaning equipment size and cost.

A still further advantage according to the present invention is the use of alkali sulfur absorbents in the recirculating bed material of the CFB boiler and devolatilizer that provides substantial sulfur capture and eliminates the need for $H_2S$ removal.

A further advantage of the present invention is that the process can be used either at atmospheric pressure or gas turbine supply pressure. At gas turbine supply pressure, the turbine exhaust enters a conventional HRSG and is not utilized as the CFB char combustor air supply. The pressurized CFB char combustor air supply is thus provided by a portion of the gas turbine air compressor discharge.

A still further advantage of the present invention is that the process can be conducted with or without a supplemental HRSG when gas turbine exhaust gas output exceeds CFB boiler combustion air requirements or when the process is operated in a pressurized mode.

Another advantage of the present invention is that the process can be used with or without CFB boiler external or internal bed gas turbine air pre-heaters.

Features of the present invention include, but are not limited to, the use of partial supplemental raw coal or other feed to the CFB boiler when coal char or other feed char production is insufficient to fully utilize turbine exhaust for combustion air supply (at expense of some efficiency); the use of partial or full CFB boiler supplemental combustion air supply when gas turbine exhaust has insufficient $O_2$ or if cycle simplicity is desired (at expense of some efficiency); the use of steam and/or partial or oxygen air supply to the devolatilizer/thermal cracker or hot product gas stream when (1) additional gas yield and lower char yield is required to maximize gas turbine (Brayton cycle) output, or (2) insufficient heat or temperature for full devolatilization or thermal cracking is available via CFB boiler recirculating hot bed material; the devolatilized cracked high Btu product gas can be cooled (via heat exchanger or water quench) and cleaned of particulate, condensibles, and acid gases prior to gas turbine use (after a portion is recycled for devolatilizer fluidization gas) or hot gas cleaning methods can be used, preserving sensible heat for improved gas turbine efficiency; and the CFB boiler can be run in a reducing (substoichiometric) mode producing CO fuel gas to supplement the high Btu gas or used indirectly via fired gas turbine air or steam heat exchangers.

Accordingly, one aspect of the present invention relates to a process for generating power from a carbonaceous feed which comprises the steps of:

a. providing first and second fully entrained flow circulating fluidized bed reaction zones through which a loop of heat-conveying materials continuously circulate and are fluidized by first and second fluidizing gases, respectively;

b. introducing a volatile-containing carbonaceous feed into the first fully entrained flow circulating fluidized bed reaction zone;

c. heating the carbonaceous feed with heat-conveying material, for a time period sufficient to produce (1) a product gas comprised of partially thermally cracked volatiles and (2) substantially devolatilized carbonaceous feed. The heat conveying material enters the first reaction zone at a first temperature between about 1000° F. and about 2400° F. and exits at a second temperature lower than the first temperature because of the endothermic heat requirements of the first reaction zone;

d. separating substantially devolatilized feed and heat-conveying materials from the product gas and recycling some of the product gas as the majority of the first fluidizing gas;

e. introducing into the second fully entrained flow circulating fluidized bed reaction zone substantially devolatilized carbonaceous feed with heat conveying material from step d and, as a second fluidizing gas, an oxygen containing turbine exhaust gas;

f. exothermically reacting the substantially devolatilized carbonaceous feed in the presence of the oxygen-containing turbine exhaust gas at a temperature above the temperature of the first reaction zone for a time period sufficient to substantially combust the substantially devolatilized carbonaceous feed to produce a flue gas, preheat gas turbine compressed air feed, generate high pressure steam conveyed to a steam turbine to provide power and, elevate the temperature of the heat conveying material from the second temperature to the first temperature;

g. introducing the product gas and air into a gas turbine and combusting the product gas and air in the gas turbine thereby providing power and producing an oxygen containing turbine exhaust having a temperature of at least 800° F. to about 1200° F.; and h. recycling the oxygen containing turbine exhaust gas of step g to the second reaction zone as the second fluidizing gas and the sole or primary combustion air supply.

In another aspect, the present invention relates to a system, that at least includes, a. a first fully entrained flow circulating fluidized bed reactor including a circulating bed of heat conveying material for devolatilizing and thermally cracking volatile containing carbonaceous feed and being capable of producing substantially devolatilized carbonaceous feed and a product gas, said first fully entrained flow circulating fluidized bed reactor including, 1. an inlet for introducing volatile containing carbonaceous feed to be devolatilized and thermally cracked;
2. a separator for separating substantially devolatilized feed and circulating heat conveying material from product gas and including an outlet for removing separated product gas for heat recovery and scrubbing;
3. a first heat recovery system connected to the outlet for recovering sensible heat from the product gas;
4. a first recycle line for returning some of the product gas for use as part of a fluidizing gas for the first fully entrained circulating fluidized bed reactor;
5. optionally, supplemental ports for introducing steam and/or air or oxygen to increase gas yields and reduce char yields, especially with lower volatile containing feeds; and b. a second fully entrained flow circulating fluidized bed reactor containing a furnace section, a boiler section, a solids/gas separator section and, a continuously circulating bed of heat conveying material thus being capable of conducting an exothermic reaction between substantially devolatilized carbonaceous feed and an oxygen containing turbine exhaust gas to produce flue gas, high pressure steam, preheated gas turbine compressed air and, reheated heat conveying material to a temperature at or above the first temperature;

c. a first flow line in flow communication with the separator for conveying one portion of the separated substantially devolatilized carbonaceous feed and heat conveying material from the first fully entrained flow circulating fluidized bed reactor into the second fully entrained flow circulating fluidized bed reactor;

d. a second flow line for conveying heat conveying material from the second fully entrained circulating fluidized bed reactor separator into the first fully entrained circulating fluidized bed reactor;

e. a third flow line for conveying the product gas from the first fully entrained circulating fluidized bed reactor to a scrubbing system to remove nitrogen and sulfur containing pollutants to produce a cleaned product gas;

f. a fourth flow line for conveying a first portion of the cleaned product gas to the first fully entrained fluidized circulating bed gasifier and a second portion to a compressor for producing compressed product gas for gas turbine fuel for providing power;

g. a gas turbine air compressor for forming a compressed air feed for the gas turbine combustor and expansion turbine;

h. a fifth flow line for conveying gas turbine compressed air to a gas turbine combustor; and i. a gas turbine combustor connected to the fourth and fifth conveying lines for receiving and combusting the second portion of cleaned product gas with compressed air thereby providing a source of power and a reusable turbine exhaust, and including a sixth flow line for introducing the turbine exhaust into the second fully entrained flow circulating fluidized bed reactor as a fluidizing gas.

These and other objects, advantages, features and aspects of the present invention will become more apparent from the following detailed description and annexed drawings.

DETAILED DESCRIPTION OF INVENTION

Figure 1A:
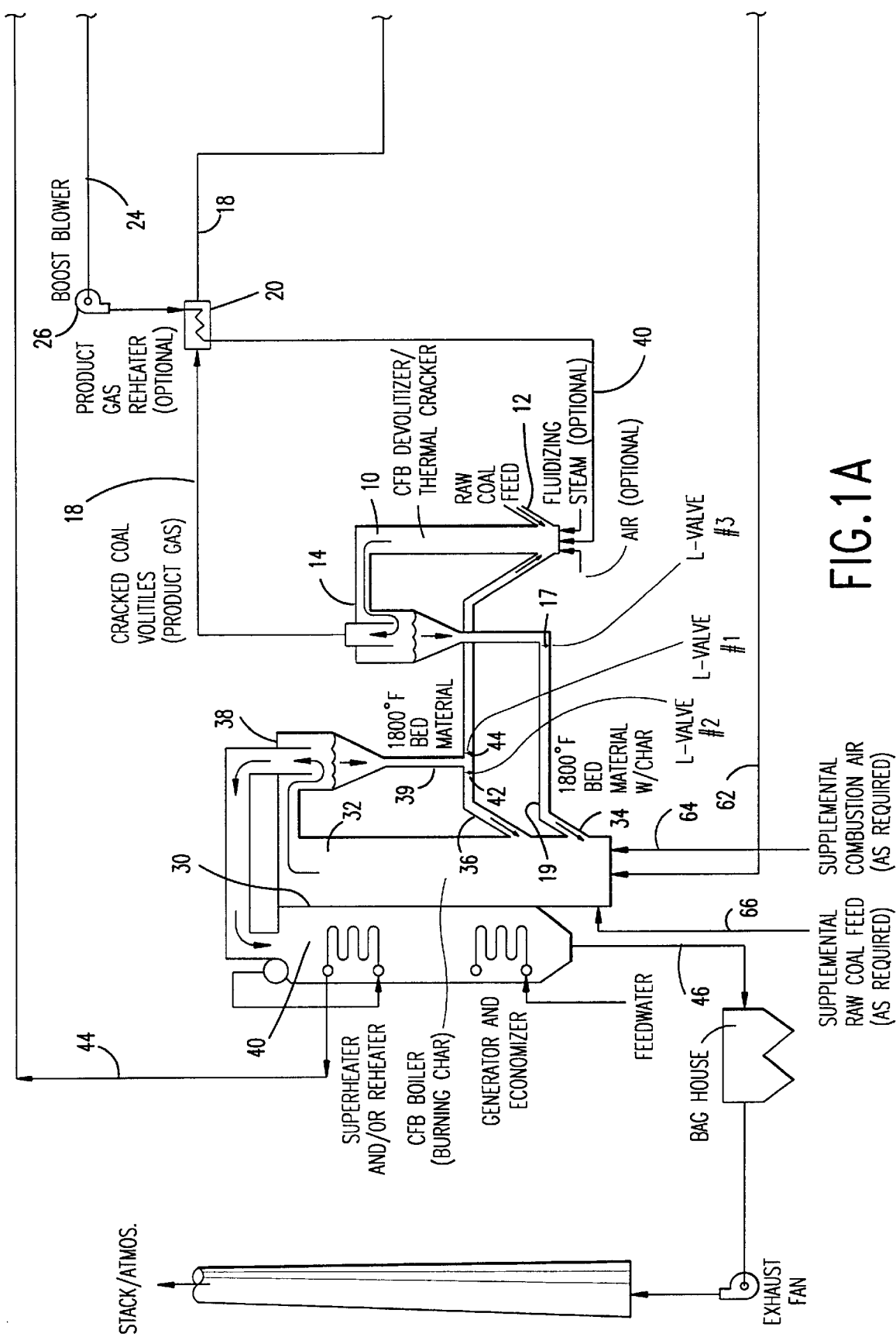
FIGS. 1A and 1B shows a flow chart illustrating a first embodiment according to the present invention without preheating the compressed air supply for the gas turbine combustor. The power generating cycle is simplified at the expense of some overall efficiency loss. If the feed contains insufficient volatiles to produce enough fuel gas to maximize gas turbine output (Brayton cycle) relative to steam turbine output (Rankine cycle) then supplemental fluidizing steam and/or air or oxygen can be used in the devolitilizer to increase gas output and reduce char output via partial oxidation.

The present invention provides a combined cycle power plant ("CCPP") process and an apparatus for its practice. Thus, the present invention integrates a CFB boiler burning devolatilized coal char (e.g. reactor, reaction zone), and a CFB coal devolatilizer/thermal cracker (e.g. reactor, reaction zone). The devolatilizer/thermal cracker is heated indirectly with hot solids recirculated from said CFB coal char burning boiler. It is fluidized to entrainment velocity by recirculating a portion of the thermally cracked coal volatiles. The thermally cracked coal volatiles fuels the gas turbine. Gas turbine exhaust is used as both fluidizing gas and a combustion air source for the CFB coal char burning boiler.

In a preferred embodiment of the present invention, gas turbine compressor air discharge, also referred to as compressed air, (typically 600° F. to 700° F.) is preheated. Preheat is provided by gas turbine exhaust (typically 900° F. to 1200° F.) and/or sensible heat from the product gas (cracked coal volatiles) and/or the char burning CFB boiler hot bed material and/or exhaust (flue) gas. This maximizes the ratio of more efficient, lower capital cost Brayton cycle power output (gas turbine cycle) to less efficient, higher capital cost, Rankine cycle power output (steam cycle) for coal with a given percent of volatiles content. As a practical matter, because the char CFB boiler will be operating with a bed temperature between 1500° F. and 2000° F. and the CFB devolatilizer/thermal cracker at a temperature slightly below that, a significant quantity of product gas must be utilized to reach current gas turbine maximum firing temperatures of 2350° F. (with 2500° F. proposed for future turbine designs). Heating turbine air compressor discharge above 1200° F. is more suitable for ceramic heat exchangers than for metal heat exchange surfaces.

Coal volatile content varies significantly with coal grade or rank. Anthracite coal has almost no volatiles and would not be well suited for the power cycle of the present invention. The carbonaceous feed used in the present invention should contain over 20% volatiles content to produce sufficient gas turbine fuel, e.g. product gas. Supplemental steam and/or air or oxygen can be used to increase gas yield on lower volatile fuels. There is no upper limit to the volatile content of the carbonaceous feed which can be used. If with high volatile content feeds there is insufficient char to achieve optimal steam cycle efficiency for the CFB boiler, which also serves as the gas turbine heat recovery steam generation or HRSG, then supplemental fuel or a portion of the product gas can be used in that boiler. Bituminous coal typically contains from 20% to 30% volatiles by weight and could be satisfactorily utilized. If combustion of bituminous coal volatiles produced provides insufficient gas turbine exhaust to meet all of the CFB char boiler's combustion air supply requirements, supplemental combustion air may be added.

Regardless of coal volatile content, there will always be sufficient coal volatiles to fluidize the CFB devolatilizer/thermal cracker to a fully entrained flow velocity by simply increasing the portion of the product gas recycled and/or using supplemental steam and air or oxygen. Fluidization velocities characterizing bubbling or stationary fluid beds and circulating or entrained beds are governed by bed particle size and density. For the type of reactors, e.g., combustors and gasifiers that relate to the subject invention, particle size and densities would generally result in bubbling beds below 5 ft./sec., fully entrained or CFB flows above 15 ft./sec. and transitional and sometimes unstable flows between 5 and 15 ft. sec. Suitable entrained flow velocities for this invention are between 10 and 50 ft./sec. and preferably 20 to 40 ft./sec. Above 50 ft./sec., severe erosion of reactors and cyclones can occur.

Lower ranking coals like sub-bituminous coal, lignite, and peat have progressively higher volatile content. While the subject invention is described with various coals, suitable volatile containing carbonaceous feeds may also include orimulsion, oil shale, tar sands and biomass. If the present devolatilization method for high volatile feeds results in too much gas turbine fuel and consequently too much turbine exhaust to be effectively used as char CFB boiler fluidizing gas and combustion air (while preserving minimum excess air for good boiler efficiency), then part of the turbine exhaust can be taken to a heat recovery steam generator (HRSG). A less costly, although somewhat less efficient alternative would be to add some raw coal to the CFB char burning boiler, increasing the boiler combustion air requirements such that it could be fully satisfied by the gas turbine exhaust (gas turbine exhaust typically contains approximately 15% $O_2$ which is more than adequate for CFB boiler combustion air supply).

Further, by using turbine exhaust produced according to the present invention or even from a conventional natural gas fired turbine for the CFB boiler combustion air supply, greater $O_2$ utilization (lower excess air) and higher boiler efficiency are obtained. Turbine exhaust supplied to a fully-fired CFB boiler combustor will also produce lower $NO_x$ emissions compared to a conventional air supplied CFB boiler due to the flue gas recirculation effects of lower $O_2$ turbine exhaust (12%–15% $O_2$ versus 20%).

The CFB char burning boiler and CFB devolatilizer/thermal cracker of the present invention can be operated at about atmospheric pressure (15 to 30 psia) or at the gas turbine fuel supply pressure (typically 10 to 30 atmospheres). The differential pressure between the two reactors would typically be kept to less than 1 atmosphere to avoid the loss of gas sealing between the two vessels and gas leakage from one to the other. If operated at high pressure, the turbine is exhausted to an atmospheric HRSG and the CFB char burner combustion air is supplied by the gas turbine air compressor or a separate air compressor.

The process can be operated with and without a supplemental HRSG. It can be operated with or without supplemental air supply or supplemental coal supply to the CFB char burning boiler. It can be operated with or without a recuperator and with or without gas turbine air preheaters.

If the CFB devolatilizer/thermal cracker operating temperature is insufficient to get adequate devolatilization and/or cracking or gas yields, steam and/or air or oxygen can be added with or substituted for the fluidizing recycled product gas to boost temperature and/or gas yields with only a minor dilution in product gas heating value. The CFB char burning boiler can also be operated at sub-stoichiometric conditions to produce Co rather than $CO_2$ (both diluted with $N_2$). This low Btu CO fuel gas can be cleaned, compressed and mixed with high Btu product gas and be burned in the gas turbine or, alternatively, it can be burned separately in a fired heater to either preheat gas turbine compressed air or to produce high pressure super-heated steam. As used herein, "low BTU gas" refers to a gas with less than 150 BTU/SCF, on a higher heating basis. By "medium BTU gas" is meant a gas with 150 to 350 BTU/SCF on a higher heating basis. A "high BTU gas" is a gas with above 350 BTU/SCF on a higher heating basis.

The heat-conveying bed material according to the present invention can be inert refractory material (e.g., sand, quartz, silica, glass, etc.), an alkali absorbent (e.g., limestone, dolomite) or a supported catalyst. Because the subject invention can utilize a conventional CFB coal boiler (having a boiler section, entrained bed combustion section and solids/gas separator section) and a conventional commercially available gas turbine, an existing CFB coal boiler can, therefore, be repowered with an increase in efficiency and out-put via the addition of a CFB coal devolatilizer/thermal cracker and a gas turbine (essentially as shown in FIG. 1). The only non-commercial equipment involved in repowering an existing CFB boiler with the subject technology would be the CFB coal devolatilizer/thermal cracker which, due to its high throughput, is small, simple to construct, and relatively low in cost.

Many gas turbines have expander capacity which is 10% to 25% larger than their air compressor capacity. When such gas turbines are utilized, clean product gas can be moisturized utilizing available low grade sensible waste heat from product gas cooling or CFB boiler flue gas cooling. This technique can increase turbine output by up to 20% with some concurrent heat rate improvement.

According to the present invention, the residence time in the devolatilizer is for a time period sufficient, between 0.5 to 5 seconds, to produce (1) a product gas comprised of partially thermally cracked volatiles and (2) substantially devolatilized solid carbonaceous feed. The partially cracked volatiles provide some of the first fluidizing gas. The heat-conveying material enters the CFB devolatilizer/thermal cracker at a first temperature between about 1000° F. and about 2400° F. and exits at a second temperature lower than the first temperature because of the endothermic heat requirements of the first reaction zone (CFB devolatilizer/thermal cracker). The devolatilized solids' temperature at which CFB devolatilizer/thermal cracker is operated is above about 1000° F., preferably above about 1400° F. and most preferably above about 1700° F. Moreover, the devolatilized solids' temperature is below about 2400° F., preferably below about 2200° F. and most preferably about 2000° F. Operating the CFB devolatilizer/thermal cracker at temperatures below 1000° F. will provide poor devolatilization of the carbonaceous feed material and result in inadequate thermal cracking. At temperatures above 2400° F., slagging and fusing of ash will occur in the CFB devolatilizer/thermal cracker.

The CFB boiler of the present invention exothermically reacts the substantially devolatilized feed from the CFB devolatilizer/thermal cracker in the presence of the oxygen-containing turbine exhaust gas. The reaction occurs at a temperature above the temperature of the CFB devolatilizer/thermal cracker. The exothermic reaction occurs over a time period sufficient to substantially combust the substantially devolatilized feed and produce a flue gas. The hot flue gas and bed material is used to preheat turbine air and generate high pressure steam and, with the heat liberated by the exothermic reaction, elevate the temperature of the heat conveying material from the second temperature to a temperature greater than or equal to the first temperature.

In the gas turbine according to the present invention, cleaned product gas and compressed air are combusted and form a turbine exhaust that has a temperature of at least 800° F. to about 1200° F. and also contains sufficient oxygen for use in a CFB boiler.

The systems shown in FIGS. 1A, 1B, 2A and 2B include flow lines for the materials being transferred between the various treatment stages. These flow lines will include the necessary valves and flow control devices known to those skilled in the art to assist in the transfer of solids and/gases between treatment stages, although they are not shown. Where necessary, pumps, compressors and blowers also will be used, their placement and capacities being within the skill of a practitioner of the art.

The present invention will now be described with reference to FIGS. 1A, 1B, 2A and 2B.

Figure 1B:
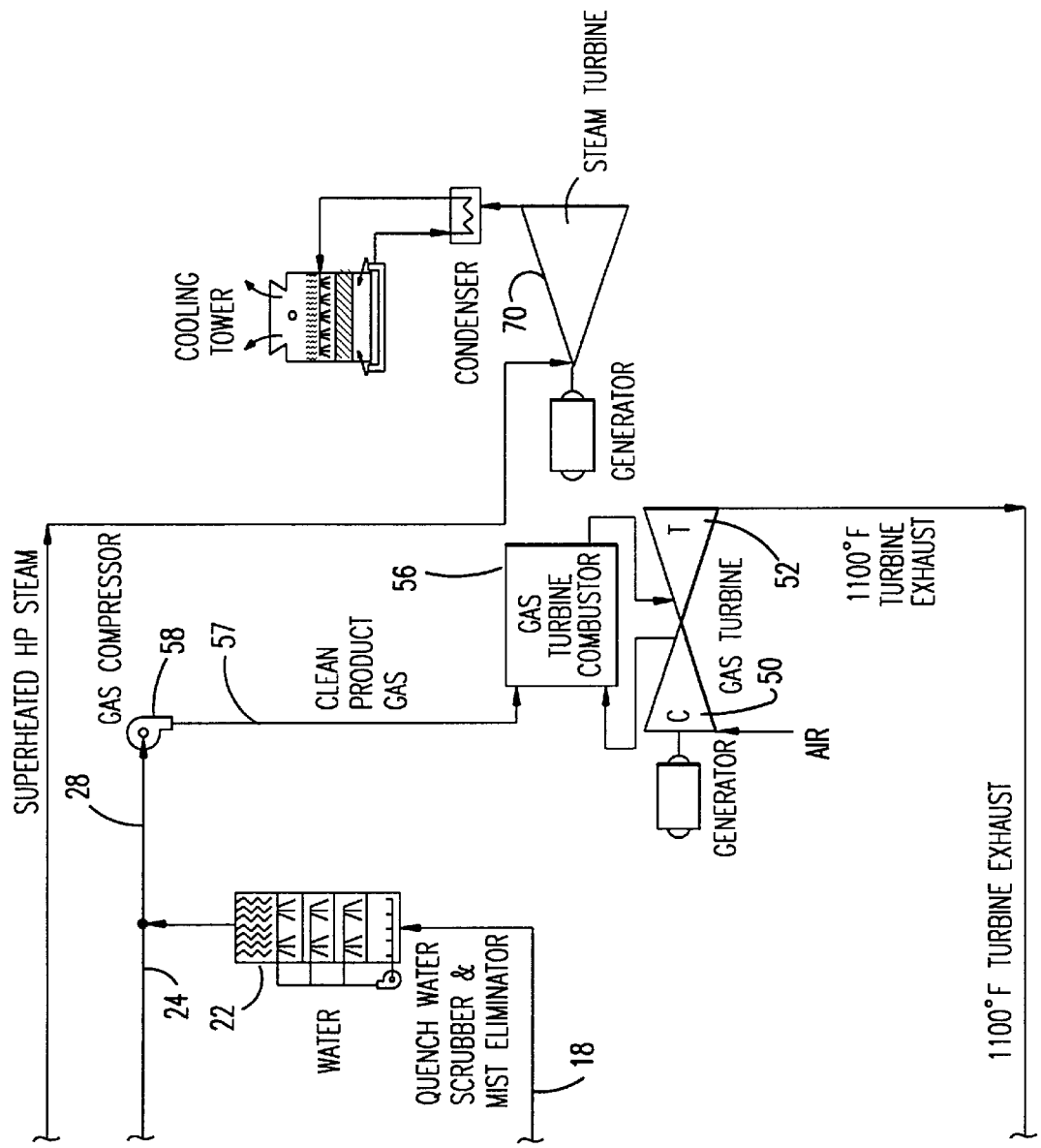

In FIGS. 1A and 1B raw coal or other volatile containing carbonaceous feed, previously crushed to a size consistent with entrained flow or CFB reactors (used synonymously), typically below ¼" maximum particle size, is introduced through a low pressure type sealed feeder such as a rotary lock hopper, star valve, or other pressure sealed feeder such as those in commercial use on existing CFB boilers. The feed material is introduced through one or more feed ports (12) into the bottom of an entrained flow CFB reactor (10). The reactor (10) is refractory lined and insulated. Hot heat conveying material from the CFB boiler system (30) through line (45) is fed into the bottom of said CFB devolatilization/thermal cracking reactor (10) through one or more feed ports (16). The feed material and hot solid heat conveying bed material are conveyed upward in entrained flow through the reactor (10) by transport gas which is recycled product gas (24), which may be supplemented or replaced with steam and/or air or oxygen for enhanced gas production. The transport gas is introduced through the bottom of reactor (10) through line (40) and through a perforated distributor plate (not shown) common to commercial CFB boilers and reactors. As the hot solid heat conveying materials and raw feed material are transported up the reactor (10) at a velocity sufficient to maintain stable entrained flow (above 10 ft/second and preferably above 15 ft/second), heat in the hot bed material is transferred to the raw feed material by a combination of conduction, convection, and radiation heat transfer modes. Volatiles are thereby driven out of the feed material and at least partially thermally cracked into lower molecular weight non-condensible gases (product gas).

The solids are removed from the top of the reactor (10) and are passed to a solids gas separation system (14) which can be one or more cyclone type separators, labyrinth type separators (U-beams or chevrons), or similar devices commonly used on CFB boiler systems in commercial use. The hot product gas is removed from the separator (14) passed through line (18) where some of its heat may be exchanged indirectly in a product gas reheater (20) where cold, clean product gas used for CFB devolatilizer fluidization gas through line (40) is reheated. Cooled product gas line (18) is then conveyed through a product gas quenching and cleaning system (22) of conventional design, removing $H_2S$ particulate and condensible liquids. The cleaned product gas from system (22) is split and a portion of the product gas is recycled through line (24) where its pressure is boosted by a low pressure blower (26) sufficiently to be utilized as fluidizing gas in reactor (10). The major portion of product gas from gas cleaning system (22) is compressed in a high pressure gas compressor (58) before it is passed to the gas turbine combustor (56).

Solids that are discharged from separator (14) are somewhat cooler than those that are fed to the devolatilizer through line (45). This is because of the endothermic devolatilization and cracking reactions plus endothermic heat requirements necessary for evaporation of any moisture associated with the raw feed material and heat up feed material to reactor temperature (plus losses through equipment insulation). The separated solids from system (14) include both solid heat conveying material and residual char. This material is unfluidized in the separator bottom and a connected unfluidized stand-pipe (15). This material is conveyed through line (19) by a controlled L-valve, J-valve, or other commercially available solids recirculation control valve (17) in common use on CFB boilers and similar fluidized systems. The cooled heat conveying material with char is introduced into the CFB boiler system furnace (reaction zone 32) through one or more feed ports (34) in the bottom of furnace (32). The CFB boiler system (30) is of conventional commercial design and can have either refractory lined insulated walls or be lined with steam generating water tubes (water wall construction). Hot heat conveying material recirculated within the CFB boiler system is fed to the bottom of the CFB furnace (32) via one or more ports (36). Gas turbine exhaust is used as fluidizing gas for the CFB boiler furnace (32) and is introduced through line (62) through a distributor plate (not shown) of conventional design located at the bottom of the CFB boiler furnace (32).

If turbine exhaust provides insufficient $O_2$ for efficient burning of char in the CFB boiler system (30), supplemental combustion air can be added through line (64). If insufficient char is produced in the devolatilizer (10) to efficiently utilize the quantity of $O_2$ contained in the gas turbine exhaust line (62), then supplemental coal feed can be added to the CFB boiler furnace (32) through line (66) to maintain good boiler efficiency.

Solids and gases are discharged through the top of the CFB boiler furnace (32) and are introduced into a gas/solids separator (38). Separated gases are ducted to a conventional convective boiler section (40) containing superheaters, reheaters, steam generators, and economizers. Separated solids from separator (38) are introduced into an unfluidized standpipe (39) where they are redirected either to the CFB devolatilizer/thermal cracker reactor (10) via line (45) through a solids circulation control valve (41) or recirculated back to the CFB boiler furnace (32) through a second solids circulation control valve (42). Superheated steam from the CFB boiler system is conveyed through line (44) to a conventional steam turbine generator (70) for power generation utilizing a Rankine cycle type system. This system includes a condenser and cooling tower and may or may not contain several stages of re-heat and feedwater heating common to such systems. CFB boiler flue gases are discharged from the boiler convective section (40) through line (46) and are passed through typical pollution control equipment and a stack prior to venting to the atmosphere.

Clean, compressed fuel gas is introduced into a conventional commercial gas turbine combustor (56) through line (57). The conventional gas turbine also contains a compressor section (50) and a turbine section (52) which drives both the compressor and a generator that makes electrical power.

In FIGS. 1A and 1B, a cycle efficiency is maximized by using feeds with high volatile content or by increasing devolatilizer gas production such that 50% to 75% of feed energy is converted to turbine (Brayton cycle) gas or liquid fuel and char production is limited to that needed for bed sand reheating and production of high pressure reheated steam to also maximize cycle efficiency.

Figure 2A:
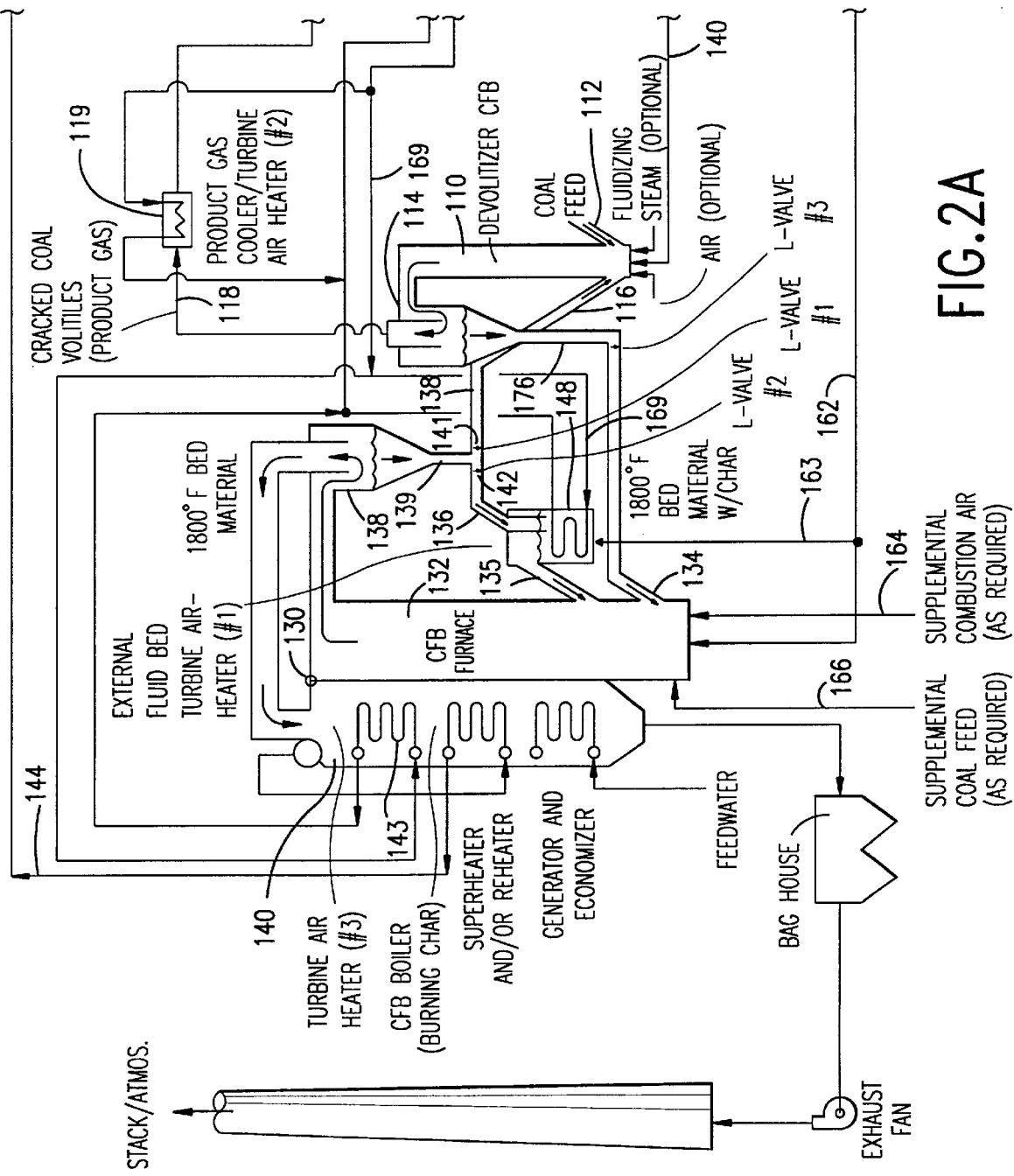
FIGS. 2A and 2B shows a flow chart illustrating a preferred embodiment according to the present invention where gas turbine (Brayton cycle) power output is maximized and steam turbine (Rankine cycle) output is correspondingly reduced by utilizing a significant portion of turbine exhaust heat, product gas sensible heat, CFB boiler bed material heat, and CFB boiler flue gas heat to preheat gas compressor discharge air prior to its introduction into the gas turbine combustor.
Figure 2B:
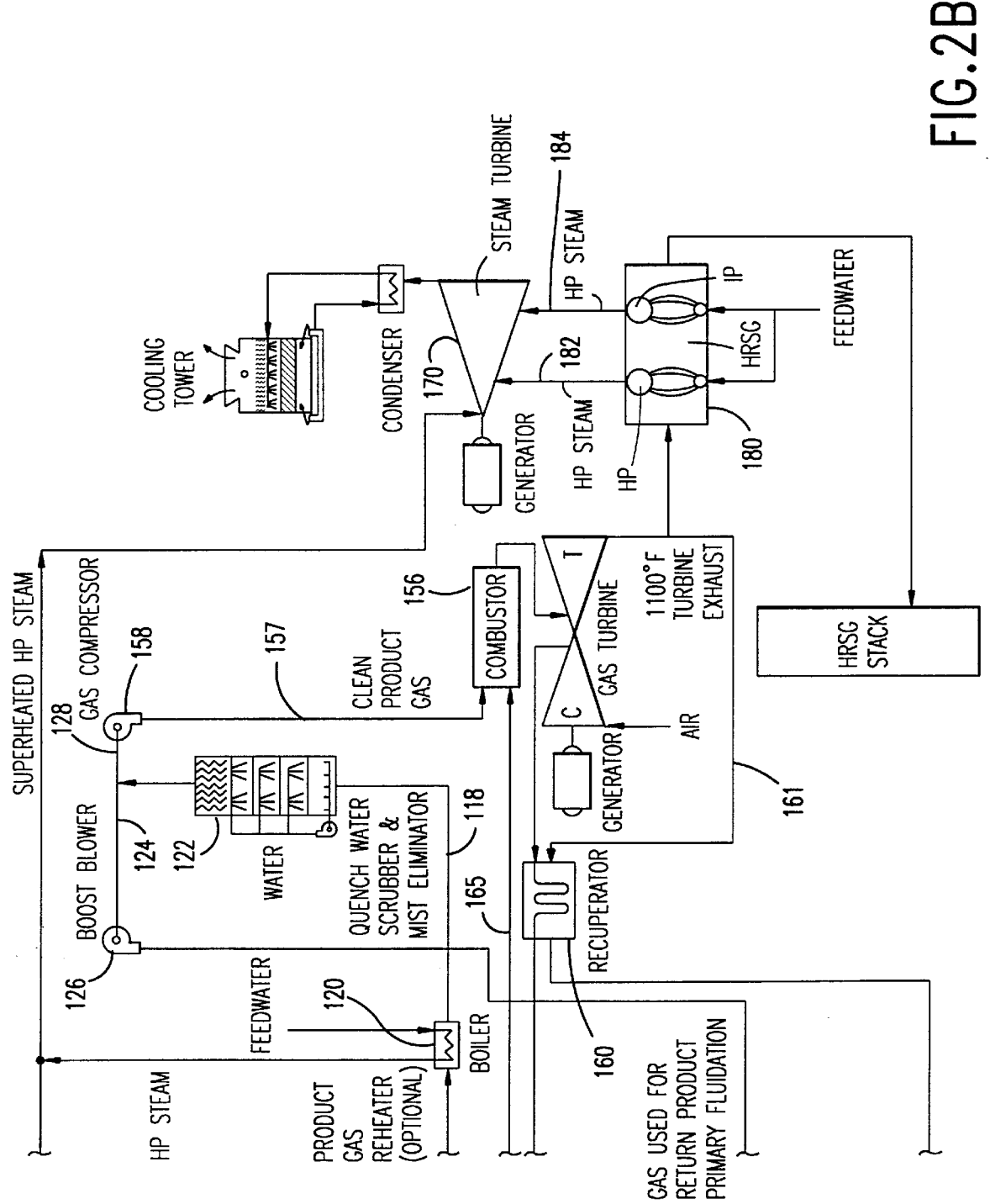

In FIGS. 2A and 2B, an alternative embodiment of the invention, thermal heat is recovered at several locations for pre-heating gas turbine compressor air, i.e., compressed air, to the maximum possible temperature prior to burning fuel gas. This maximizes the ratio of more efficient gas turbine (Brayton cycle) power output to less efficient steam turbine (Rankine cycle) power output. A common numbering system with FIGS. 1A and 1B is used for common elements except for the prefix "1".

Feed and operation of the CFB devolatilizer/thermal cracker (reactor) is unchanged from the system described for FIGS. 1A and 1B. As in FIG. 1, cooled heat conveying solid bed material and char from the devolatilizer/thermal cracker (110) is conveyed via line (115) through entrance port(s) (134) to the CFB boiler furnace section (132). Furnace heat-conveying solids and gases are then passed through a solids gas separator (138). A portion of the separated hot solids in the insulated standpipe (139) are recirculated back to the CFB devolatilizer/thermal cracker (110) through solids control valve (141) and line (145). The remaining heat conveying solids are conveyed to an external fluid bed turbine air heater (148) after passing through solids circulation control valve (142) and line (136).

Compressed turbine air preheated in a recuperator (166) is passed via lines (167) to the external fluid bed air heater (148). The external fluid bed turbine air heater (148) is fluidized to stationary fluid bed velocity (less than 7 ft/sec and preferably less than 5 ft/sec) with a portion of gas turbine exhaust gas conveyed via lines (162) and (163). Preheated air in line (169), elevated in temperature, is returned to the turbine combustor via line (165). This external fluid bed air heater is similar to external fluid bed superheaters currently in use on commercially available CFB boilers. Somewhat cooled bed material exiting the external fluid bed air heater is introduced into the bottom of the CFB boiler furnace (132) through one or more entrance ports (135).

CFB boiler flue gases exit the particle separator (138) and are introduced into the boiler convective section (140). The flue gasses are first cooled by transferring heat to an additional gas turbine compressed air heater (143) that is supplied with compressed air from line (167). The heated compressed air returns to the gas turbine combustor via lines (169) and (165).

Hot cracked volatiles (product gas) from the CFB devolatilizer/thermal cracker (110) via line (118) are first cooled in an additional turbine compressed air heater (119) that is supplied with gas turbine compressed air from supply line (167) and heated compressed air is returned to line (165). Cooler product gas is removed from air heater (119) and is further cooled in a boiler (121) that generates high pressure superheated steam. This steam is conveyed to the steam turbine (170) via line (144). The product gas is then further quenched and cleaned and conveyed to the gas turbine as described in FIGS. 1A and 1B.

The amount of heat recovery available through all of the gas turbine compressed air heaters (148, 143, and 119) is limited by material considerations. Metal tubing currently utilized on steam boiler superheaters is limited to about 1100° F. High temperature metal alloys and ceramics under development will allow higher temperatures. Preheating turbine air to temperatures approaching the CFB boiler bed material temperatures (typically 1800° F. to 2000° F.) allows a substantially larger portion of the total system heat to be utilized in the more efficient gas turbine cycle rather than the less efficient steam turbine cycle.

With higher volatile feeds, it is possible to produce more product gas for use in the gas turbine and, therefore, it is possible to produce more turbine exhaust than can be efficiently utilized in the CFB boiler (130) while maintaining the minimum excess air required (typically less than 20% above stoichiometric $O_2$ requirements) for good boiler efficiency. Rather than suffer poor boiler efficiency, one alternative described in FIG. 2 is where supplemental raw coal feed is directly introduced into the CFB boiler furnace (132) through line (166) as previously described. A more desirable alternative, however, is where the excess portion of turbine exhaust is conveyed through line (179) to a conventional heat recovery steam generator (HRSG) (180) common in commercial gas turbine combined cycle power plants, prior to taking such cooled gas turbine exhaust to an exhaust stack. High pressure and intermediate pressure steam from the HRSG (180) is utilized in the steam turbine through lines (182) and (184).

Although the invention has been described in conjunction with a specific embodiment, many alternatives and variations will be apparent to those skilled in the art in light of this description and the annexed drawings. Accordingly, the invention is intended to embrace all of the alternatives and variations that fall within the spirit and scope of the appended claims. Further, the subject matters of the above-cited United States patents are incorporated herein by reference.

What is claimed is:

1. A process for generating power from a volatile containing carbonaceous feed, comprising:
  a. providing first and second fully entrained flow circulating fluidized bed reaction zones through which a loop of heat-conveying materials continuously circulate and being fluidized by first and second fluidizing gases, respectively;
  b. introducing a volatile-containing carbonaceous feed into said first fully entrained flow circulating fluidized bed reaction zone;
  c. heating said volatile containing carbonaceous feed with said heat-conveying materials, for a time period sufficient to produce a product gas comprised of partially thermally cracked volatiles and substantially devolatilized feed, said heat-conveying material entering the first reaction zone at a first temperature between about 1000° F. and about 2400° F. and exiting at a second temperature lower than said first temperature because of the endothermic heat requirements of said first reaction zone;
  d. separating said substantially devolatilized feed with said heat-conveying materials from said product gas;
  e. either increasing product gas yield or devolatilization reaction temperature in step c by substituting steam and/or air or oxygen as the fluidizing gas;
  f. introducing into said second fully entrained flow circulating fluidized bed reaction zone said substantially devolatilized feed together with said heat-conveying material from step e and, as said second fluidizing gas, an oxygen containing turbine exhaust gas;
  g. exothermically reacting said substantially devolatilized feed in the presence of said oxygen-containing turbine exhaust gas at a temperature above the temperature of said first fully entrained flow circulating fluidized reaction zone for a time period sufficient to substantially combust said substantially devolatilized feed, produce a flue gas, preheat a compressed air feed for a gas turbine, generate high pressure steam conveyed to a steam turbine to provide power and elevate the temperature of said heat-conveying material from said second temperature to a temperature equal to or greater than said first temperature;
  h. separating elevated temperature heat conveying material in step g and conveying a portion of said elevated temperature heat conveying material to said first reaction zone;
  i. compressing a portion of said product gas from step e and forming a compressed product gas;
  j. providing compressed air from a gas turbine compressor;
  k. introducing said compressed product gas and said compressed air into a gas turbine combustor, combusting said compressed product gas and said compressed air in said gas turbine thereby providing power and an oxygen containing turbine exhaust having a temperature of at least 800° F. to about 1200° F.; and
  l. recycling said oxygen containing turbine exhaust gas of step k to said second fully entrained flow circulating fluidized reaction zone as said second fluidizing gas.

2. The process according to claim 1, wherein said fully entrained flow circulating fluidized bed reaction zones are respectively operated at or above the gas turbine operating pressure.

3. The process according to claim 1, wherein said volatile containing feed is biomass.

4. The process according to claim 1, wherein said volatile containing feed is Orimulsion.

5. The process according to claim 1, wherein said volatile containing feed is residual or heavy crude oil.

6. The process according to claim 1, wherein said volatile containing feed is pitch.

7. The process according to claim 1, further including the step of introducing steam and/or air or oxygen as supplemental or replacement fluidizing gas into said fully entrained flow circulating fluidized bed reaction zones to increase gas yield.

8. A process for generating power from a volatile containing carbonaceous feed, comprising:
  a. providing first and second fully entrained flow circulating fluidized bed reaction zones through which a loop of heat-conveying materials continuously circulate and being fluidized by first and second fluidizing gases, respectively;
  b. introducing a volatile-containing carbonaceous feed into said first circulating fluidized bed reaction zone;
  c. heating said feed with said heat-conveying materials, for a time period sufficient to produce a product gas comprised of partially thermally cracked volatiles and substantially devolatilized feed, said heat-conveying material entering the first reaction zone at a first temperature between about 1000° F. and about 2400° F. and exiting at a second temperature lower than said first temperature because of the endothermic heat requirements of said first reaction zone;

d. separating said substantially devolatilized feed with said heat-conveying materials from said product gas and, recycling some of said product gas for use as said first fluidizing gas;

e. either increasing product gas yield or devolatilization reaction temperature in step c by substituting steam and/or air or oxygen as the fluidizing gas;

f. introducing into said second circulating fluidized bed reaction zone said substantially devolatilized feed together with said heat-conveying material from step e and, as said second fluidizing gas, an oxygen containing turbine exhaust gas;

g. exothermically reacting said substantially devolatilized feed in the presence of said oxygen-containing turbine exhaust gas at a temperature above the temperature of said first reaction zone for a time period sufficient to substantially combust said substantially devolatilized feed, produce a flue gas, preheat compressed air for a gas turbine, generate high pressure steam and, elevate the temperature of said heat- conveying material from said second temperature to a temperature greater than said first temperature, said high pressure steam being conveyed to a steam turbine to provide power;

h. separating said re-elevated temperature heat-conveying material into first and second portions, said first portion being conveyed to said first reaction zone as said heat-conveying material;

i. providing compressed air from a compressor section of a gas turbine;

j. providing a recuperator and introducing said compressed air of step i into said recuperator in heat exchange relationship with turbine exhaust from a gas turbine thereby transferring heat from said turbine exhaust to said compressed air in said recuperator to form preheated compressed air at a first temperature;

k. providing a first air heater; introducing a portion of said compressed air of step i at said first temperature into said first air heater; and introducing product gas of step e into said first air heater thereby transferring heat from said product gas to elevate the temperature of said portion of preheated compressed air at said first temperature to a second temperature higher than said first temperature;

l. providing a fluidized bed air heater, introducing another portion of said preheated compressed air from step i at said first temperature into said fluidized bed air heater, introducing and fluidizing said separated second portion of heat-conveying material from step h into said fluidized bed air heater thereby transferring heat from said second portion of separated heat-conveying material to elevate the temperature of said another portion of preheated compressed air at said first temperature in said fluidized bed heater to a third temperature higher than said first temperature;

m. providing a second compressed air heater in a convective boiler section of said second circulating bed reaction zone, introducing a further portion of said preheated compressed air of step i into said second air heater whereby heat in said flue gas generated in said second fully entrained flow circulating fluidized bed zone transfers heat to said further portion of said compressed air in said second air heater to form preheated compressed air at a fourth temperature higher than said first temperature;

n. providing a compressed product gas;

o. providing a gas turbine; introducing said compressed product gas of step m and said preheated compressed air portions from steps j, k, l and m into said gas turbine, combusting said compressed product gas and said preheated compressed air portions in said gas turbine thereby providing power and an oxygen containing turbine exhaust having a temperature of at least 800° F. to about 1200° F. that is used as said turbine exhaust of step i; and p. recycling said oxygen containing turbine exhaust gas of step o to said second fully entrained flow circulating fluidized bed reaction zone as said second fluidizing gas.

* * * * *